(12) United States Patent
Venu et al.

(10) Patent No.: US 10,331,531 B2
(45) Date of Patent: Jun. 25, 2019

(54) SELF-TESTING IN A PROCESSOR CORE (71) Applicant: ARM Limited, Cambridge (GB)

(72) Inventors: Balaji Venu, Cambridge (GB); Kauser Yakub Johar, Cambridge (GB); Marco Bonino, Cambridge (GB)

(73) Assignee: ARM Limited, Cambridge (GB)

( * ) Notice: Subject to any disclaimer, the term of this patent is extended or adjusted under 35 U.S.C. 154(b) by 169 days.

(21) Appl. No.: 15/447,673

(22) Filed: Mar. 2, 2017

(65) Prior Publication Data
US 2017/0293541 A1 Oct. 12, 2017

(30) Foreign Application Priority Data

Apr. 11, 2016 (GB) .................................. 1606107.9

(51) Int. Cl.
*G06F 11/07* (2006.01)
*G06F 11/22* (2006.01)
*G06F 11/24* (2006.01)
*G06F 11/27* (2006.01)
*G06F 11/273* (2006.01)

(52) U.S. Cl.
CPC .......... *G06F 11/27* (2013.01); *G06F 11/0721* (2013.01); *G06F 11/0766* (2013.01); *G06F 11/0775* (2013.01); *G06F 11/0784* (2013.01); *G06F 11/22* (2013.01); *G06F 11/2236* (2013.01); *G06F 11/2242* (2013.01); *G06F 11/2284* (2013.01); *G06F 11/24* (2013.01); *G06F 11/273* (2013.01)

(58) Field of Classification Search
CPC .... G06F 11/2236; G06F 11/27; G06F 11/273; G06F 11/0766; G06F 11/0775; G06F 11/0784; G06F 11/0721; G06F 11/24; G06F 11/22; G06F 11/2242; G06F 11/2284

See application file for complete search history.

(56) References Cited

U.S. PATENT DOCUMENTS 5,818,250 A * 10/1998 Yeung .................... G01R 31/30
324/762.02
6,892,322 B1 5/2005 Snyder
(Continued)

FOREIGN PATENT DOCUMENTS

JP 58-127243 7/1983

OTHER PUBLICATIONS

Combined Search and Examination Report for GB1606107.9, dated Aug. 30, 2016, 5 pages.

*Primary Examiner* — Paul Contino
(74) *Attorney, Agent, or Firm* — Nixon & Vanderhye P.C.

(57) ABSTRACT

Apparatus and a method for processor core self-testing are disclosed. The apparatus comprises processor core circuitry to perform data processing operations by executing data processing instructions. Separate self-test control circuitry causes the processor core circuitry to temporarily switch from a first state of executing the data processing instructions to a second state of executing a self-test sequence of instructions, before returning to the first state of executing the data processing instructions without a reboot of the processor core circuitry being required. There is also self-test support circuitry, wherein the processor core circuitry is responsive to the self-test sequence of instructions to cause an export of at least one self-test data item via the self-test support circuitry to the self-test control circuitry.

18 Claims, 10 Drawing Sheets (56) References Cited

U.S. PATENT DOCUMENTS

| | | | |
|---|---|---|---|
| 6,934,884 B1* | 8/2005 | Wakabayashi | G01R 31/318335 714/30 |
| 7,509,533 B1 | 3/2009 | Govindarajalu | |
| 2002/0091997 A1* | 7/2002 | Alford | G06F 11/366 717/127 |
| 2004/0153630 A1* | 8/2004 | Henry | G06F 9/30145 712/209 |
| 2007/0101108 A1 | 5/2007 | Grossman et al. | |
| 2013/0254892 A1* | 9/2013 | Kaufman | G06F 21/55 726/24 |
| 2014/0173344 A1* | 6/2014 | Kang | G11C 29/1201 714/30 |
| 2014/0181794 A1* | 6/2014 | Grawrock | G06F 11/3636 717/128 |
| 2015/0006807 A1* | 1/2015 | Chang | G11C 29/022 711/106 |
| 2015/0074459 A1* | 3/2015 | Hong | G06F 11/2236 714/30 |

* cited by examiner

SELF-TESTING IN A PROCESSOR CORE

This application claims priority to GB Patent Application No. 1606107.9 filed 11 Apr. 2016, the entire contents of which is hereby incorporated by reference.

The present disclosure relates to the field of data processing. More particularly it relates to self-testing in a processor core to identify faults.

A processor core may be provided with the capability to identify faults which develop in the processor core over time. One approach to self-testing is to provide two processor cores which operate in lock-step, so that differences in the output of one core can be identified by reference to the output of the other. Another approach is software-based, which may be preferred over the dual-core lock-step approach because of the reduced area and power savings associated therewith. However, the extent and complexity of contemporary processor cores can mean that such software itself may need to be extensive and complex. Furthermore, a balance generally needs to be stuck between frequently executing the self-test software and thus quickly identifying faults in the core, and accepting greater disruption that the execution of this self-test software causes. The self-test software not only temporarily puts the "real" data processing of the core on hold, but further the result of executing the self-test software is then typically written out to memory. Depending on the context in which the processor core is implemented, a relatively high "fault grading" capability may be required of the self-test functionality. For example, it may be required that a fault grading capability of greater than 90% is provided (i.e. the self-testing is capable of identifying at least 90% of the possible faults which could occur). Indeed in some safety critical implementations the fault grading capability may be required to be greater than 99%. In order to provide such fault grading capability using self-test software, a great deal of effort may need to be invested in order to write and iteratively optimize such software, and for this reason when a very high fault grading capability is required the dual-core lock-step approach may be preferred.

In at least some embodiments the present techniques provide an apparatus comprising processor core circuitry to perform data processing operations by executing data processing instructions; self-test control circuitry to cause the processor core circuitry to temporarily switch from a first state of executing the data processing instructions to a second state of executing a self-test sequence of instructions, before returning to the first state of executing the data processing instructions without a reboot of the processor core circuitry being required; and self-test support circuitry, wherein the processor core circuitry is responsive to the self-test sequence of instructions to cause an export of at least one self-test data item via the self-test support circuitry to the self-test control circuitry.

In at least some embodiments the present techniques provide a method of operating a data processing apparatus, comprising the steps of performing data processing operations in processor core circuitry in a first state by executing data processing instructions; signalling from self-test control circuitry to cause the processor core circuitry to temporarily switch from the first state to a second state of executing a self-test sequence of instructions, before returning to the first state of executing the data processing instructions without a reboot of the processor core circuitry being required; and causing an export of at least one self-test data item via self-test support circuitry in the processor core circuitry to the self-test control circuitry.

In at least some embodiments the present techniques provide an apparatus comprising means for performing data processing operations by executing data processing instructions; means for controlling a self-test process comprising causing the means for performing data processing operations to temporarily switch from a first state of executing the data processing instructions to a second state of executing a self-test sequence of instructions, before returning to the first state of executing the data processing instructions without a reboot of the means for performing data processing operations being required; and means for supporting the self-test process, wherein the means for performing data processing operations is responsive to the self-test sequence of instructions to cause an export of at least one self-test data item via the means for supporting the self-test process to the means for controlling the self-test process.

The present techniques will be described further, by way of example only, with reference to embodiments thereof as illustrated in the accompanying drawings, in which.

At least some embodiments provide an apparatus comprising processor core circuitry to perform data processing operations by executing data processing instructions; self-test control circuitry to cause the processor core circuitry to temporarily switch from a first state of executing the data processing instructions to a second state of executing a self-test sequence of instructions, before returning to the first state of executing the data processing instructions without a reboot of the processor core circuitry being required; and self-test support circuitry, wherein the processor core circuitry is responsive to the self-test sequence of instructions to cause an export of at least one self-test data item via the self-test support circuitry to the self-test control circuitry.

The present techniques provide an approach to self-testing which combines both software and hardware aspects. A self-test controller (hardware monitor) is provided externally to the processor core which administers the self-testing. This hardware monitor could be provided in a number of different ways, but may for example be provided as a peripheral device to core (CPU) to which commands are issued with respect to the self-testing that needs to be carried out. Additionally, self-test support circuitry is provided via which self-test data items can be exported to the self-test control circuitry. This means that the self-test data items are provided to the self-test control circuitry in a very direct manner. This is to be contrasted to prior art software-based approaches to self-testing in which the exporting of self-test data items typically involves those self-test data items being written out to memory (for example in the form of a cyclical redundancy check (CRC) value) which requires the self-test software to control many aspects of the operation of the core, for example involving additional instructions (such as store instructions) to propagate this data out through the memory system to the memory. In consequence, the present techniques provide that the self-test data items are more directly observable, despite coming from potentially "deep" within the core. Additionally, the present techniques do not require that the processor core is put into a special self-testing state in order to perform its self-testing and therefore the processor core can readily switch between its usual data processing and the self-testing by means of its normal context switching mechanisms. Moreover following a period of self-testing, the processor core can return quickly to executing (regular) data processing instructions without needing to reboot (reset) itself. Fast context switching between regular data processing and self-testing is therefore supported.

In some embodiments the processor core circuitry is capable of completing the export of the at least one self-test data item after returning to the first state of executing the data processing instructions. The provision of the self-test support circuitry, via which the self-test data items are exported to the self-test control circuitry, provides an independent path, in particular independent to the memory interface/system of the processor core and thus there is no need after a period of self-test for any "clearance" of the self-test data items through a particular stage of the memory system before usual execution of data processing instructions (in the first state) can resume.

In dependence on the particular self-test data items which are to be exported from the processor core to the self-test control circuitry, and therefore where in the processor core the self-test data items originate, the self-test support circuitry may take a variety of forms. In one embodiment the self-test support circuitry comprises a dedicated self-test data path from the processor core circuitry to the self-test control circuitry. Efficient and independent exporting of the self-test data items to the self-test support circuitry is thus supported.

In some embodiments the self-test test support circuitry comprises instruction type indication circuitry and the at least one self-test data item comprises at least one instruction type indication provided by the instruction type indication circuitry, wherein the self-test control circuitry is responsive to reception of the at least one instruction type indication to maintain an instruction type count, and wherein the self-test control circuitry is capable of comparing the instruction type count to an expected instruction type count. Accordingly, the self-test control circuitry can thus be configured to monitor instruction types of the data processing instructions being executed by the processor core. Further, the instruction type represents a signal within the processor core which is generally already present (in the sense that a processor core without self-test capability would typically have this signal) and therefore the additional self-test support circuitry required to enable the export of an instruction type indication is modest. This self-test control circuitry can maintain an instruction type count, for example counting instances of one particular instruction type (although counts of more than one instruction type are also contemplated) and then compares this count to an expected instruction type count (on the basis of the known self-test sequence of instructions which was executed). Where a difference in the instruction type count and the expectation occurs this is indicative of a fault in the core prior to the point at which the instruction type indication has been "picked out of" the core. Note that there is no need for there to be any knowledge of how the processor core is structured for this technique to work, meaning that these monitoring techniques can be applied to a great range of processor core circuitry and indeed that laborious bespoke configuration of the self-testing capability for the specific processor core is not needed). For example, where a system designer has flexibility in the particular configuration and layout of a processor core, there is no need for the self-test techniques to be reconfigured, as could otherwise often be the case for a purely software-based approach.

The instruction type indication circuitry, providing the instruction type indication, may be provided at a range of locations within the processor core circuitry. For example, in some embodiments the processor core circuitry comprises instruction fetch circuitry and the instruction type indication circuitry is comprised within the instruction fetch circuitry. For example, the instruction type may be used in the instruction fetch circuitry to determine how a given instruction is handled in parts of the processor core circuitry which follow the instruction fetch circuitry. Just one example of this is the situation where the processor core circuitry comprises multiple execution pipelines and issuance of an instruction to one of those execution pipelines is dependent on the instruction type, since each execution pipeline may have its own specialisms.

Indeed, the present techniques recognise that, for the purposes of self-testing, the instruction type indication may be maintained to a later stage in the pipeline (even though it may not explicitly be needed by those later parts of a pipeline), such that it can be used as an indicator within a self-test context. The instruction type indication can be exported from the processor core circuitry at a number of points along the execution pipeline, thus providing a mechanism by which a finer granularity of identification of the location of a fault is supported.

As mentioned above, the instruction type indication may be exported from a range of positions within the processor core circuitry, and in some embodiments the processor core circuitry comprises instruction retirement circuitry and the instruction type indication circuitry is comprised within the instruction retirement circuitry. Accordingly, although the instruction type indication may not be required to be maintained as far as the instruction retirement circuitry (i.e. essentially the end of execution pipeline), the maintenance of this information to this point within the execution pipeline means that the self-testing can identify a fault all the way up to this point in the execution pipeline.

The self-test support circuitry can also be implemented in other ways within the processor core circuitry. For example in some embodiments the processor core circuitry comprises memory transaction buffering circuitry temporarily to hold memory transaction requests before the memory transaction requests are issued to a memory system, wherein the self-test support circuitry comprises memory transaction request indication circuitry and the at least one self-test data item comprises at least one memory transaction request indication provided by the memory transaction request indication circuitry, wherein the self-test control circuitry is responsive to reception of the at least one memory transaction request indication to maintain a memory transaction request count, and wherein the self-test control circuitry is capable of comparing the memory transaction request count to an expected memory transaction request count. Indications of memory transactions requests thus represent another example of the self-test data items which may be exported to the self-test control circuitry, and the self-test support circuitry in such examples comprises memory transaction requests indication circuitry, for example forming part of a bus interface unit and/or a store buffer. The self-test control circuitry can identify faults in the processor core circuitry related to memory transactions by comparing the number of memory transaction requests seen (counted) to an expected number.

In some examples the self-test support circuitry comprises memory transaction request indication circuitry before the memory transaction buffering circuitry and after the memory transaction buffering circuitry, and the at least one self-test data item comprises memory transaction requests indications from before and after the memory transaction buffering circuitry. Accordingly, not only can the number of memory transaction requests be checked to be correct both before and after the buffering circuitry, but for example where the buffer circuitry has a configuration in which memory transaction requests are merged into the same entry in the buffer when they relate to the same or similar (small offset) addresses, monitoring the number of memory transaction requests before and after the buffer can identify if this process is happening correctly or if a fault has developed.

Memory transaction buffering circuitry, for example a store buffer, may be configured to continually drain its entries as soon as this is possible (i.e. to pass those requests out through the memory system to an external memory). Indeed the memory system itself may apply back pressure to cause the store buffer to drain its entries as soon as possible. This may cause difficulties in terms of monitoring numbers of memory transaction requests within the memory transaction buffering circuitry. To address this the present techniques in some examples provide that the self-test support circuitry comprises memory transaction blocking circuitry to block issuance of the memory transaction requests to the memory system in dependence on a blocking signal from the self-test control circuitry. This ability to block issuance of the buffered memory transaction request thus enables a stable state of the memory transaction buffering circuitry temporarily to be established, to facilitate memory transaction request counting.

Criteria for asserting and releasing the blocking signal may be variously configured but in some examples the self-test control circuitry is capable of asserting the blocking signal until an indication is received from the memory transaction buffering circuitry that the memory transaction buffering circuitry is full. This not only allows a more thorough testing of the memory transaction buffering circuitry, but also presents an efficient mechanism for determining when to release the blocking signal.

There are various ways in which the memory transaction buffering circuitry may be determined to be full, but in some examples this is done by monitoring the number of memory transaction requests which enter the memory transaction buffering circuitry, where it is known how many memory transaction requests the buffering circuitry can hold.

Nevertheless the present techniques recognise, as mentioned above, that the memory transaction buffering circuitry may merge memory transaction requests into a single entry and accordingly there may not be a simple correspondence between the number of memory transaction requests which the buffering circuitry receives and the number of entries which are occupied as a result. Hence in some embodiments the indication that the memory transaction buffering circuitry is full comprises a full buffer signal generated by the memory transaction buffering circuitry. Thus, when all entries in the buffer are occupied the buffer generates the full buffer signal.

The present techniques further recognise however, that when seeking to fill up the memory transaction buffering circuitry deadlock situations may occur which can prevent the memory transaction buffering circuits from reaching that full status. For example where a fault in an address register has caused a change of address, the buffering circuitry may be unable to add a transaction request to the required entry because the entry to be used for that address is (erroneously) fully occupied and the system then hangs, waiting for that entry to clear (which it can't do due to the assertion of the blocking signal). To address this the present techniques provides some examples of the self-test control circuitry with timer circuitry and the self-test control circuitry is responsive to an elapsed period signal from the timer circuitry to assert a time out error signal. For example, when the blocking signal is asserted and the memory transaction buffer circuitry begins filling the timer may be started and once the buffer and circuitry is full the timer is cleared before the elapsed period. If the elapsed period is reached this is an indication that a deadlock may have occurred and an error can be notified in this situation.

The self-test control circuitry may cause the processor circuitry to switch between the first and second states in a variety of ways. In some examples the self-test control circuitry is capable of causing the processor core circuitry to operate in the second state of executing the self-test sequence of instructions for a predetermined time period before returning to the first state. The predetermined time period can thus be set such that period of running of the self-test software does not significantly affect the usual data processing operation of the processor core circuitry. When in the second state (executing the self-test sequence of instructions) interrupts to the processor core may be disabled and if the processor core is to nevertheless respond quickly to an interrupt (as may be essential in some implementations) then a limited run time of the self-test software is necessary.

Another mechanism which may be provided to support this limited disruption of the self-test functionality to the normal operation of the core is by applying priorities to the software executed. For example, in some embodiments the processor core circuitry is capable of switching between data processing operations for more than one application defined by corresponding sets of data processing instructions, wherein each application has a predefined priority and the processor core circuitry is responsive to an execution request for an application having a higher predefined priority than a predefined priority of a currently executing application to suspend the currently executing application and to execute the application having the higher predefined priority, and wherein the self-test sequence of instructions is defined to have a predefined priority lower than the highest priority available in the apparatus. This configuration then ensures that the self-test sequence of instructions cannot dominate and may always be ended by a higher priority application, thus providing the system designer, in particular the software author, with a mechanism to ensure that critical applications can always be assured of execution, prioritised over the self-test application.

The self-test control circuitry itself may be controlled in a variety of ways, but in some examples one or more commands are issued by the processor core to configure the self-test control circuitry and/or cause it to perform particular tasks. For example, in some embodiments the self-test control circuitry is responsive to at least one received command by performing at least one of configuring itself and the processor core circuitry for operation in the second state; causing the processor core circuitry to switch to the second state; and causing the processor core circuitry to switch back to the first state and determining a self-test result from the at least one self-test data item received from the processor core circuitry.

The result of carrying out the self-testing, in particular when it is identified that a difference in the self-test data items received by the self-test control circuitry to an expectation has occurred, may be handled in a variety of ways. In some examples the apparatus further comprises error management control circuitry, wherein the self-test control circuitry is capable of signalling a self-test result after the processor core circuitry has completed executing the self-test sequence of instructions, and the error management control circuitry is responsive to the self-test result to initiate an error response. The error management circuitry may respond to such fault identification in a number of ways, but in some examples the error response comprises disabling at least one component of the apparatus. The error management circuitry may also generate a fault grading on the basis of the self-test result.

Some examples provide a method of operating a data processing apparatus, comprising the steps of performing data processing operations in processor core circuitry in a first state by executing data processing instructions; signalling from self-test control circuitry to cause the processor core circuitry to temporarily switch from the first state to a second state of executing a self-test sequence of instructions, before returning to the first state of executing the data processing instructions without a reboot of the processor core circuitry being required; and causing an export of at least one self-test data item via self-test support circuitry in the processor core circuitry to the self-test control circuitry.

Some examples provide an apparatus comprising means for performing data processing operations by executing data processing instructions; means for controlling a self-test process comprising causing the means for performing data processing operations to temporarily switch from a first state of executing the data processing instructions to a second state of executing a self-test sequence of instructions, before returning to the first state of executing the data processing instructions without a reboot of the means for performing data processing operations being required; and means for supporting the self-test process, wherein the means for performing data processing operations is responsive to the self-test sequence of instructions to cause an export of at least one self-test data item via the means for supporting the self-test process to the means for controlling the self-test process.

Some particular example embodiments are now described with reference to the figures.

Figure 1:
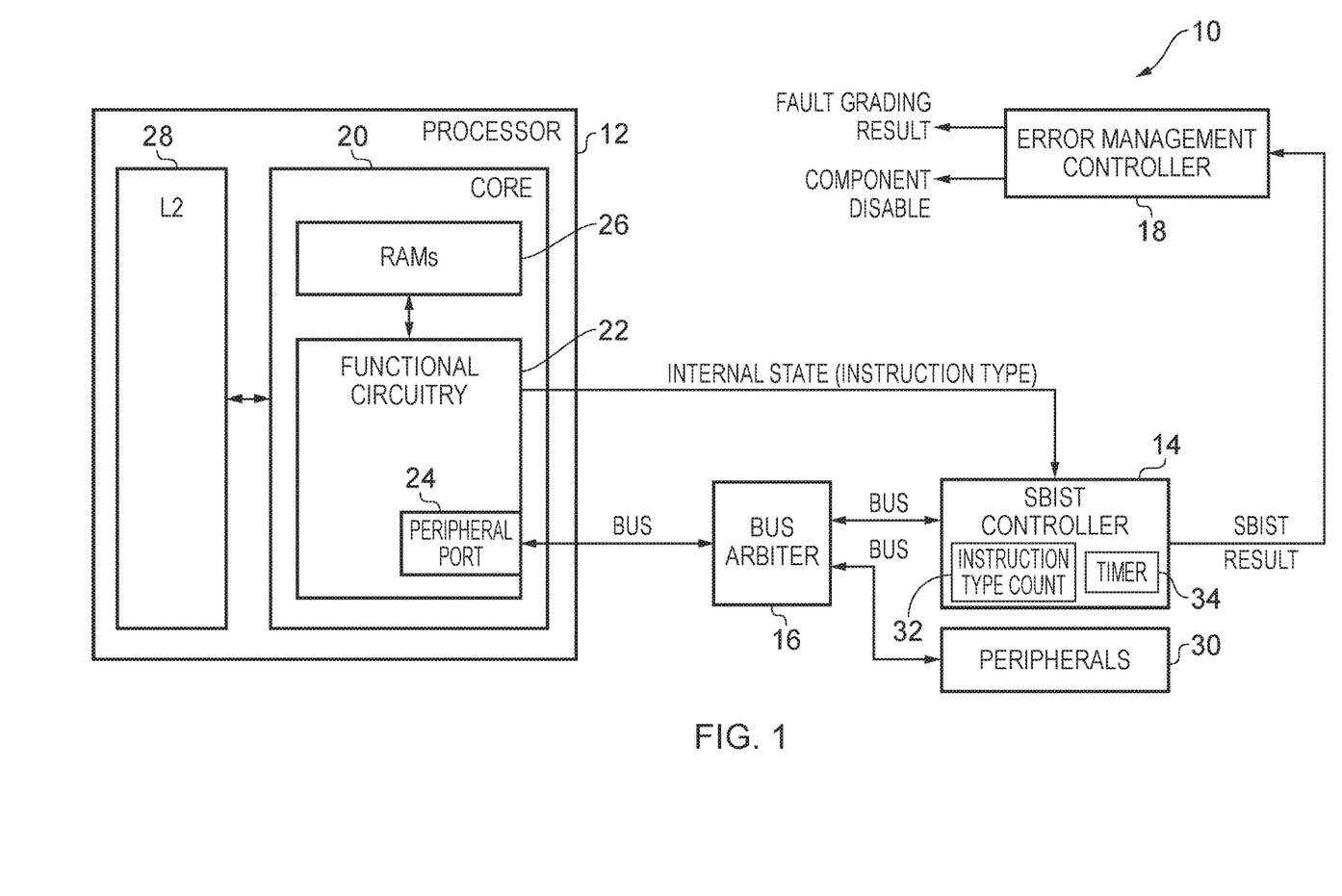
FIG. 1 schematically illustrates an apparatus in one embodiment comprising a processor core and a self-test controller.

FIG. 1 schematically illustrates an apparatus 10 in one embodiment comprising a processor 12, an SBIST (self-test) controller 14, a bus arbiter 16 and an error management controller 18. The processor 12 comprises a processor core 20, itself represented in FIG. 1 by the functional circuitry 22, the peripheral port 24 and the RAMs 26. A level 2 (L2) cache 28 is also shown. The processor core 20 communicates with peripheral devices via its peripheral port 24 and the buses shown, which in the example shown are ARM AXI buses. The bus arbiter 16 is provided such that multiple peripheral devices 30 and the SBIST controller 14 may all be coupled to the same bus structure. A number of commands are defined by means of which the processor core 20 can set up a particular configuration of the SBIST controller 14 and define its operation. In this example the commands are "configure" (with various associated configuration parameters) which configures the SBIST controller with regard to the part of the core which should be monitored and the expected result of that monitoring. In the example shown the monitoring of the core 20 comprises instruction type monitoring, wherein the SBIST controller 14 receives indications of the instruction types which are being executed by the functional circuitry 22 of the core 20. Accordingly, the SBIST controller 14 is also provided with an instruction type counter 32 in which it maintains a count of at least one instruction type. The SBIST controller 14 also comprises a timer 34, the function of which is discussed in more detail below. Timing functions can also be provided by a separate timer forming one of the peripherals 30. A "monitor" command received from the core by the SBIST controller 14 configures the controller to start monitoring the core. Finally, a "compare" command ends the monitoring and the controller then compares the result of the monitoring with the expected instruction type count 32. The result of the self-test (SBIST result) is then signalled from the SBIST controller 14 to the error management controller 18. The error management controller can generate a fault grading or for example disable a particular component of the system in response to an SBIST result which indicates a fault. Note that the instruction type is signalled directly from the functional circuitry 22, via a dedicated path, to the SBIST controller 14 and not via the peripheral port 24 and bus system.

Figure 2:
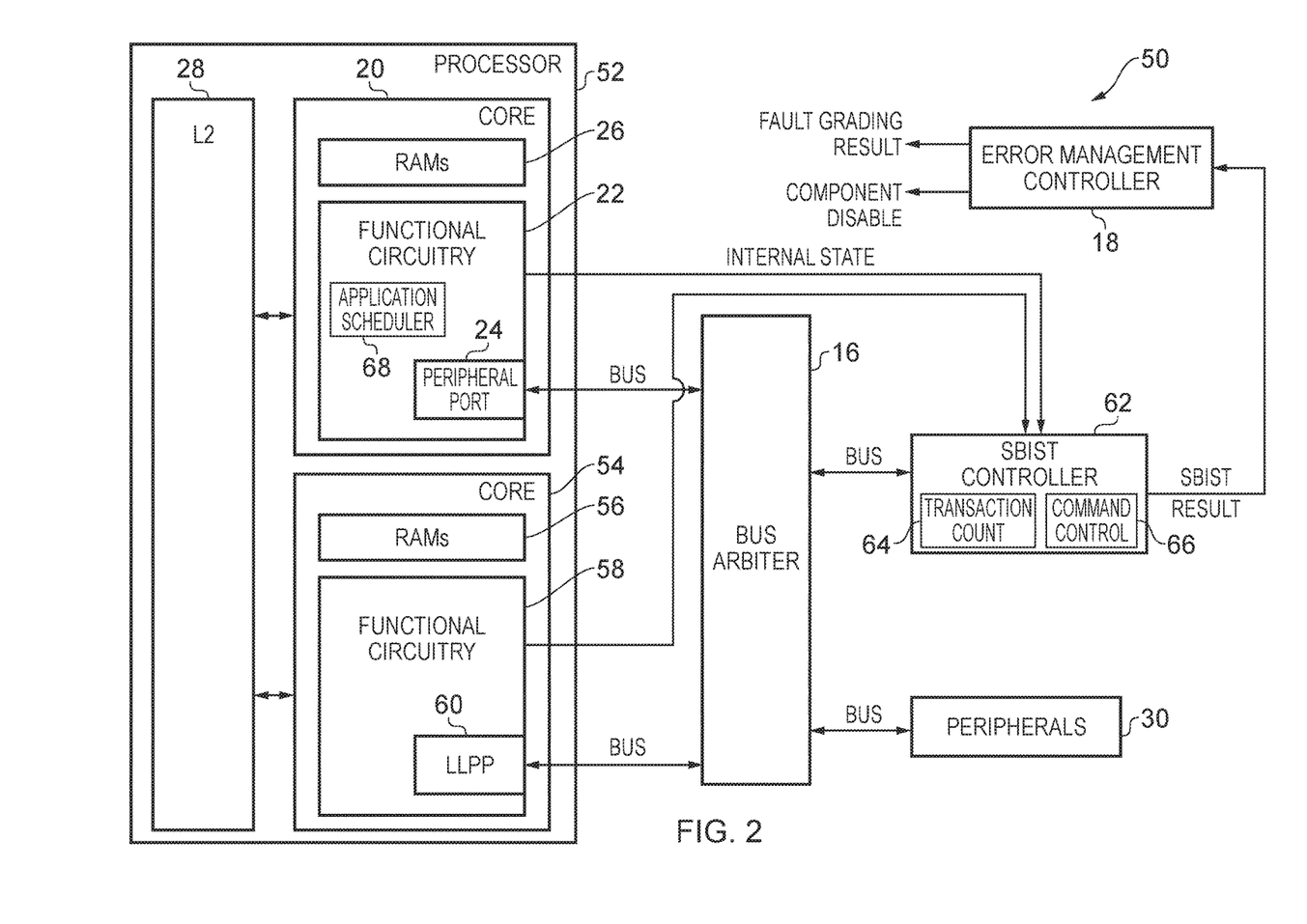
FIG. 2 schematically illustrates an apparatus in one embodiment comprising a dual core processor and a self-test controller.

FIG. 2 schematically illustrates another example system 50 which has a number of components in common with the example of FIG. 1 and these are provided with the same reference numerals and not described again here. One difference between the example apparatus 10 shown in FIG. 1 and the example apparatus 50 shown in FIG. 2 is the presence of the additional processor core 54 in the example of FIG. 2. This is similarly configured, having functional circuitry 58, RAMs 56 and a port 60 by means of which it can communicate with peripheral devices, where in the example of FIG. 2 the peripheral port 60 is a low latency peripheral port (LLPP), enabling rapid communication. Both the functional circuitry 58 and the functional circuitry 22 have a dedicated path via which they are able to directly pass items of internal state (i.e. self-test data items) to the SBIST controller 62. The SBIST controller 62 is shown in the example of FIG. 2 as maintaining a transaction count 64 which enables it to monitor memory transaction requests within either processor core and compare against an expected value. Also illustrated in FIG. 2 is the command control circuitry 66 which enables the controller to be configured according to the above mentioned "configure", "monitor" and "compare" commands received via the bus. The functional circuitry 22 also comprises an application scheduler 68 enabling multiple applications to be concurrently (though not simultaneously) executed by the functional circuitry 22, for example a "regular" application performing data processing operations and a self-test application for the purpose of passing data items to the SBIST controller 62.

Figure 3:
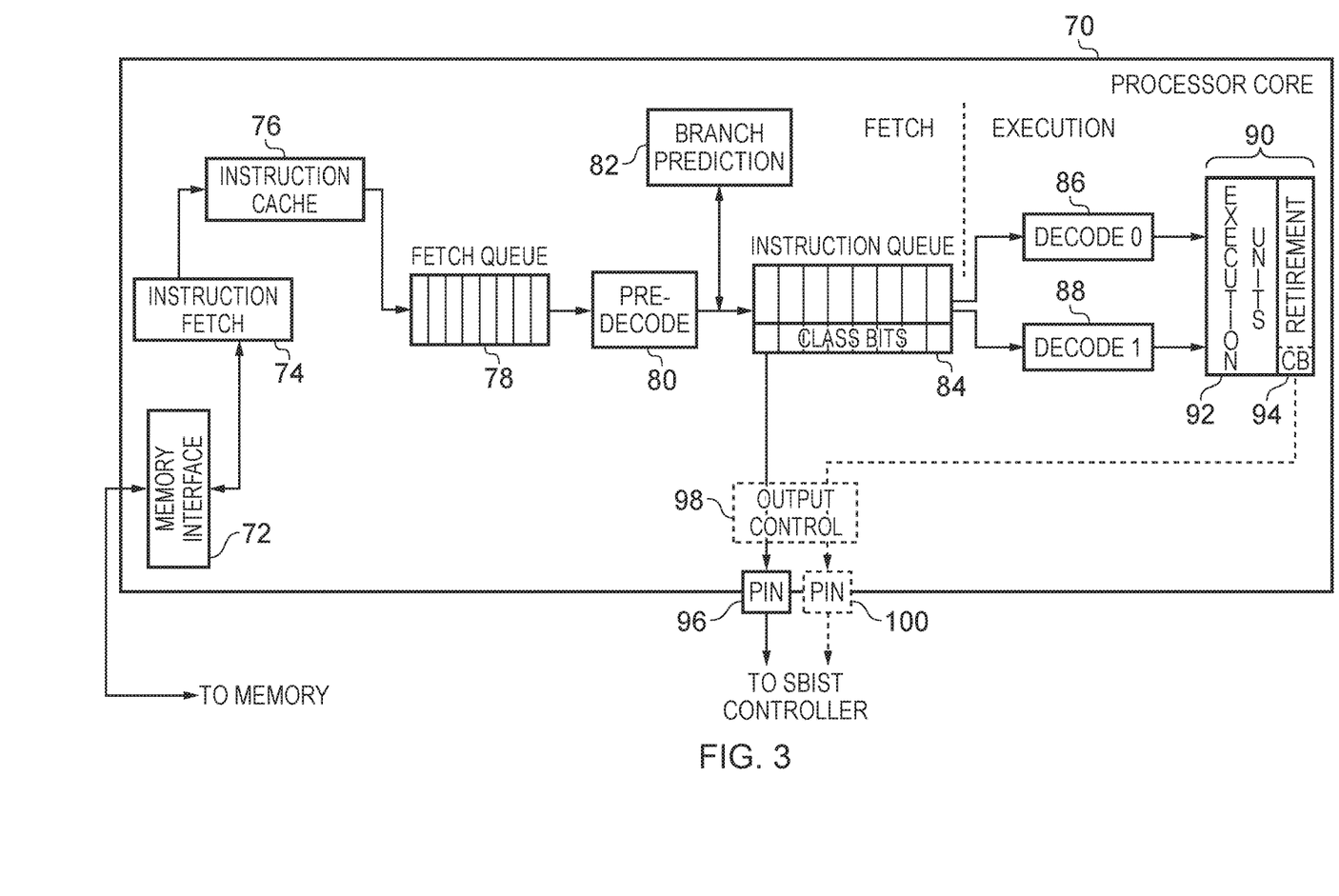
FIG. 3 schematically illustrates a processor core in one embodiment in which instruction class bits are exported to a self-test controller.

FIG. 3 schematically illustrates some components of a processor core 70 in one example embodiment, in which self-test monitoring of instruction types is carried out. A pipelined structure of the processor core 70 is illustrated. It will be understood by one of ordinary skill in the art that only a selection of components are shown in order to provide the present techniques with appropriate context. Various other components of the processor core will typically also be present with which one of ordinary skill in the art will be familiar. Shown in FIG. 3 are a memory interface 72, instruction fetch circuitry 74, an instruction cache 76, a fetch queue 78, pre-decode circuitry 80, branch prediction circuitry 82, an instruction queue 84, decode circuitry 86 and 88, and execution circuitry 90 comprising execution units 92 and a retirement stage 94. One of ordinary skill in the art will be familiar with the manner in which such a pipelined structure retrieves instructions from memory, queues them, issues them for execution, executes them and finally retires them. The arrangement shown in FIG. 3 is in particular configured to export instruction type indicators to the SBIST controller and this can be seen with reference to the instruction queue 84 where the "class bits", which are propagated through the instruction queue in association with the instructions, can be exported to the SBIST controller via the pin 96 on the periphery of the processor core 70. Depending on the number of different types of instruction which the processor core is responsive to the number of bits required to indicate a given instruction type will vary, but it will be appreciated that this will typically be a relatively limited number of bits and therefore a compact indicator to export. The SBIST controller is thereby able to count the number of instructions of a particular type which pass through this point in the execution pipeline and where a difference arises with an expected count a fault (e.g. a "stuck at" fault) in the circuitry prior to this point may be identified. The class bits are provided in association with the instructions in the instruction queue in a processor core such as that illustrated in FIG. 3 so that at the end of the instruction queue a given instruction may be appropriately issued to one of the two decode units 86 or 88, which have a dedicated configuration related to the particular set of execution circuitry which follows each of them. Previously the class bits would not have been propagated further than this point (the boundary between fetch and execution as illustrated in FIG. 3), but in one variant of the example shown in FIG. 3 the core can "artificially" maintain this class bits all the way to the final retirement stage 94 at the end of the execution pipeline. Doing this enables the identification of errors all the way up to the final retirement stage. The export of the class bits from this final stage of the execution pipeline may be performed in addition to or as an alternative to the export of the class bits from the instruction queue. Arbitration between the two steps, when they share an export pin 96, can be administered by output control arbitration circuitry 98. Alternatively, a separate pin 100 may be provided to connect to a separate dedicated path.

Figure 4:
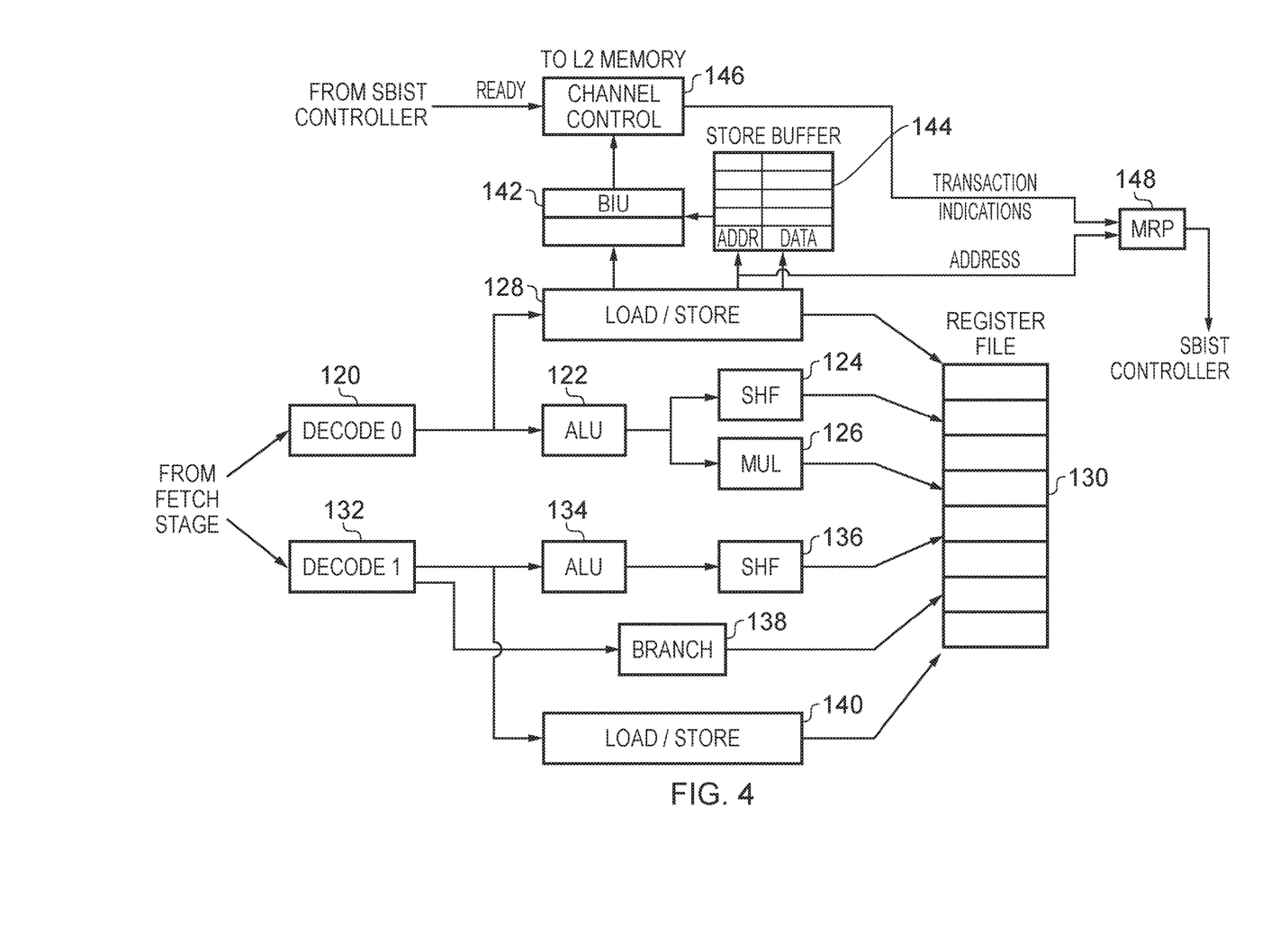
FIG. 4 schematically illustrates components of a processor core in one embodiment in which memory transaction indications are exported to a self-test controller from a bus interface unit.

FIG. 4 schematically illustrates the manner in which the present techniques may be applied to memory transaction requests in one embodiment. FIG. 4 generally illustrates two parallel execution pipelines, each having a different structure. The first comprises decode circuitry 120, arithmetic logic circuitry (ALU) 122, shift circuitry (SHF) 124, multiplication circuitry (MUL) 126, and load/store circuitry 128. The result of this execution pipeline updates content in the register file 130. The second execution pipeline comprises decode circuitry 132, ALU circuitry 134, shift circuitry (SHF) 136, branch circuitry 138, and load/store circuitry 140. The result of the processing of this execution pipeline also updates the content of the register file 130 as appropriate. The upper part of FIG. 4 further illustrates the interaction of the load/store unit 128 with an interface to the memory system. As illustrated, this interface comprises a bus interface unit (BIU) 142, a store buffer 144, and channel control circuitry 146.

Under normal usage a load issued by the load/store unit 128 passes via the BIU 142 to the L2 memory (and possibly beyond), whilst a store issued by the load/store unit 128 is temporarily buffered in the store unit (STU) 144 before passing via the BIU 142 to the L2 memory. A store memory transaction request in the store buffer 144 comprises an address, and the relevant data to be stored at that address, and the address is one self-test data item which can be exported to the SBIST controller. In the example shown in FIG. 4 this passes via a memory reconstruction port (MRP) 148. The MRP 148 can also pass transaction indications from the channel control circuitry 146 to the SBIST controller. Accordingly, the SBIST controller can monitor the number of store memory transactions both at the input to the store buffer and at the output to L2 memory. FIG. 4 also shows the channel control circuitry 146 receiving a "ready" signal from the SBIST controller which is discussed in more detail below with reference to FIG. 5.

Figure 5:
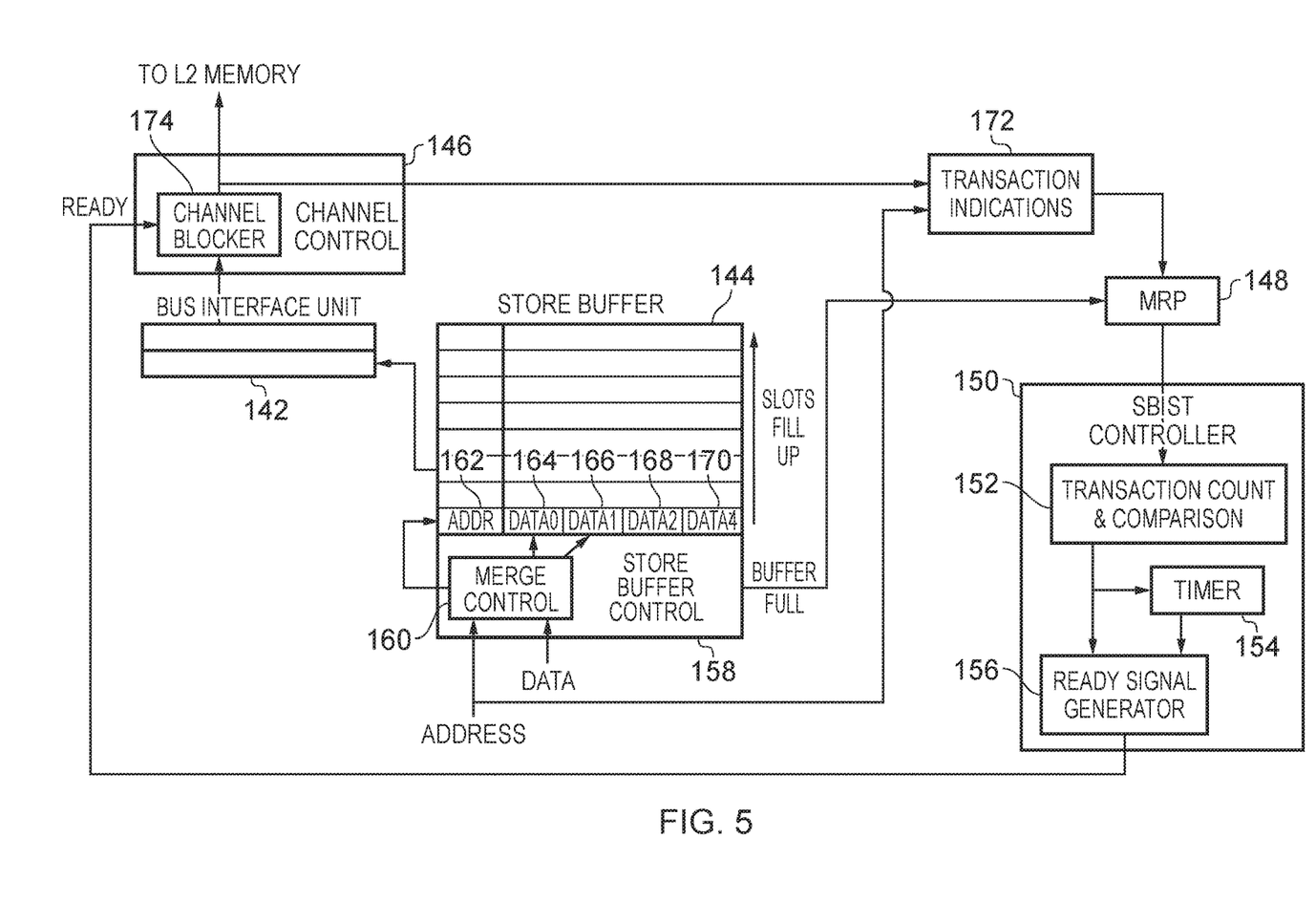
FIG. 5 schematically illustrates more detail of a bus interface unit and store buffer in one embodiment.

FIG. 5 schematically illustrates in more detail the BIU 142, store buffer 144, and channel controller 146 of FIG. 4. As can be seen in FIG. 5 the SBIST controller 150 receives information via the memory reconstruction port 148 both from before the store buffer 144 and from the channel controller 146 at the output to L2 memory. These are in the form of transaction indications 172, which may be for example be the full address or an abbreviated version where this is sufficient information for the SBIST controller. Such abbreviation may be performed by the transaction indication circuitry 172. The SBIST controller comprises transaction count and comparison circuitry 152 by means of which it can compare the observed number of transactions either before or after the interface with an expected number. The transaction comparison circuitry 152 is linked to a ready signal generator 156 which asserts or releases a ready signal which is received by channel blocker circuitry 174 of the channel control circuitry 146. The channel blocker 174 is thus transparent when the ready signal is asserted, but when it isn't the channel blocker 174 blocks the bus (AXI) channel (s) to L2 memory such that memory transactions requests cannot leave the BIU 142. This causes the slots in the BIU/142 and the store buffer (STU) 144 to fill up as memory transaction requests continue to be received. When the SBIST controller 150 determines the BIU 142 and STU 144 are full, it releases the channel, i.e. asserts the ready signal. The SBIST controller in FIG. 5 can determine that the store buffer is full from a buffer full signal received from the store buffer control circuitry 158 of the STU 144, although in some embodiments it may determine this without receiving an explicit signal by means of counting the number of transactions which have entered the store buffer and by knowledge of the number of slots in the store buffer can determine when it must be full. Once the channel is released, the SBIST controller 150 counts the number of transactions that flow out to memory and compares these against the expectation. Where a difference occurs, an error may be signalled as described above. Note that to monitor for faults using pure software techniques here would be very hard because the units continuously drain transactions to the rest of the memory system. One possibility would be to cause the software to initiate a burst of memory transactions, which floods the memory system, however this would also directly increase the run time of the testing software and the size of the corresponding code.

FIG. 5 also shows that the store buffer control circuitry 158 comprises merge control circuitry 160 to administer the process by which multiple store requests can be buffered in the same entry of the store buffer 144 where they relate to the same address. For example, each slot in the store buffer 144 can hold 16 bytes, this being four times the size (32-bit) of a data item to be stored, and thus up to four store transaction requests can be merged into one slot in the store buffer 144 by the merge control circuitry 160. Given that the present techniques relate to fault identification, it is recognised here that errors may also occur in this process itself and when a fault occurs two stores which should have been merged into one entry in the store buffer may in fact not do so due to change in the address of one of those stores (e.g. due to a "stuck at" fault in the address register). Note that the SBIST controller 150 also comprises a timer 154 which is started when the ready signal is de-asserted, and if this timer expires then the SBIST controller 150 concludes that the store buffer 144 has deadlocked in some fashion. For example where a fault in an address register has caused a change of address, the buffering circuitry may be unable to add a transaction request to the required entry because the entry to be used for that address is (erroneously) fully occupied and the system then hangs, waiting for that entry to clear (which it can't do due to the assertion of the blocking signal). The SBIST controller 150 can then signal an error to the error management controller of the system.

Figure 6:
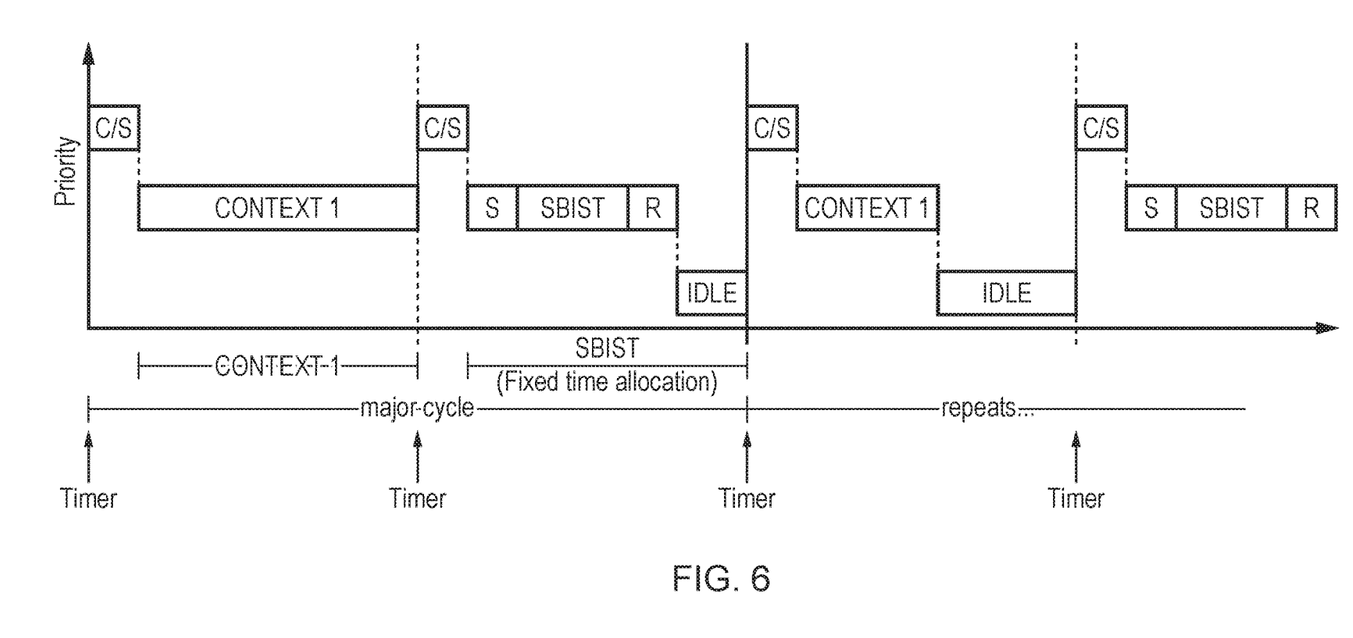
FIG. 6 is a timing diagram illustrating context switching of a processor core triggered by a timer in one embodiment.
Figure 7:
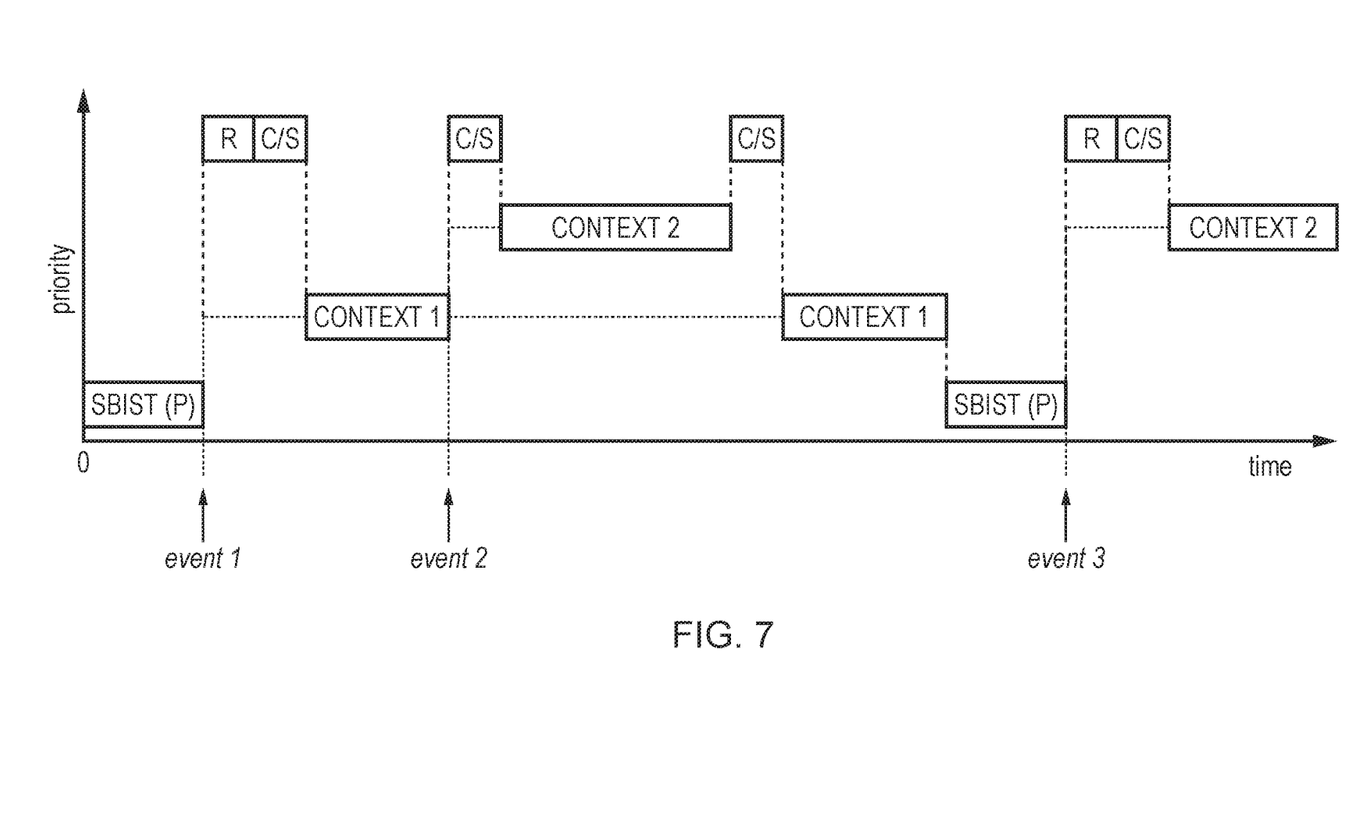
FIG. 7 is a timing diagram illustrating context switching of a processor core in one embodiment in response to predetermined events.

FIGS. 6 and 7 show timing diagrams illustrating the switching of the processor core between contexts and in particular between normal data processing operations and executing self-test instructions. In the example shown in FIG. 6 the switch between the two states is triggered by a timer provided as a peripheral in the system. Additionally, the vertical scale of the figure indicates the relative priority of the operations being carried out, wherein the context switch (C/S) operation itself has the highest priority, whilst the normal data processing operations ("context 1") and the self-test (SBIST) have the same priority and a idle state is of the lowest priority. Triggered by the timer, the processor core context switches and then begins execution of the relevant sequence of instructions (context 1 or SBIST). Note that the SBIST operation itself is sandwiched by save (S) and restore (R) phases, since whilst "ordinary" context switches between contexts merely require the general purpose registers to be pushed to memory before switching, a SBIST phase is generally more disruptive and all the other architectural registers (e.g. MPU) may also need to be pushed to memory—hence the separate save (S) and restore (R) phases. It should be noted however that the SBIST software of the present techniques can be split into multiple execution threads, each run periodically, and not all SBIST software threads will destroy the content of all registers. Hence, depending on the particular implementation, a varying number of save and restore actions for the registers will be required at each SBIST context switch as illustrated. FIG. 6 also represents the combination of the first state (in which context 1 is active) and the second state (in which the self-test is active) as a "major cycle", which then repeats indefinitely, such that regular ongoing self-testing forms part of the operation of the core and faults may be rapidly identified. Further, the setting of the timer ensures that the self-test operations are held to a limited amount of processor time and thus do not significantly impact on the usual operation of the processor core.

FIG. 7 illustrates an example timing diagram in which the transitions between the self-test context and other (regular data processing) contexts (1 and 2) are triggered by predetermined events. The relative priority of these contexts are also illustrated with the vertical scale of the figure, wherein the self-test context has the lowest priority, context 1 has the next highest priority and context 2 has a yet higher priority, with the highest priority operation being the context switch operations themselves. An example events which may trigger such context switches is for example that a higher priority context should begin execution.

Figure 8:
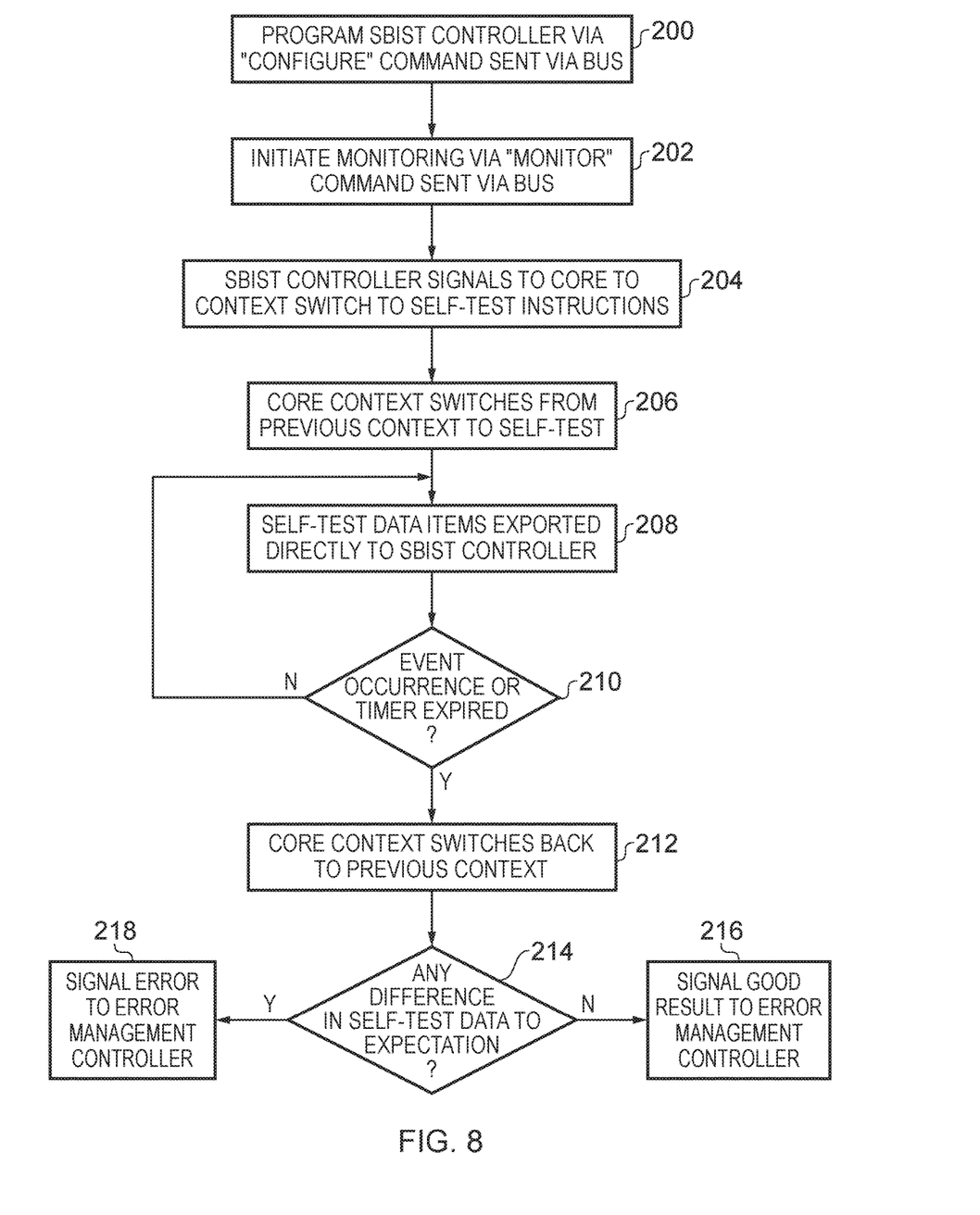
FIG. 8 shows a sequence of steps which are taken according to the method of one embodiment.

FIG. 8 shows a sequence of steps which are taken according to the method of one example embodiment. At step 200 the SBIST controller is programmed by means of the "configure" command issued by the core and sent via the connecting peripheral bus. Then, once correctly configured the self-test monitoring is initiated by means of the "monitor" command also sent via the peripheral bus from the core to the SBIST controller. In response, at step 204, the SBIST controller signals to the core that it should context switch to executing the predetermined sequence of self-test instructions. This then happens at step 206 and at step 208, as part of its response to executing those self-test instructions, self-test data items from the part of the processor core being monitored are exported directly (via a dedicated path) to the SBIST controller. Execution of the self-test instructions continues until these reach their natural conclusion, or a predetermined event occurs causing the core to context switch back to its normal data processing operations, or a timer expires indicating that a time limit for self-testing has now been reached. This determination is made at step 210 and until this is true then then the flow loops back to step 208. Thereafter, in response to a positive determination at step 210, the flow proceeds to step 212 where the core context switches back to its previous (normal data processing) context. At step 214 it is determined by the SBIST controller if there is a difference between the self-test data observed and a predetermined expectation. If there is not then at step 216 this "good" SBIST result is signalled to the error management controller of the system, whilst if a difference is observed then this error is similarly signalled (at step 218) to the error management controller.

Figure 9:
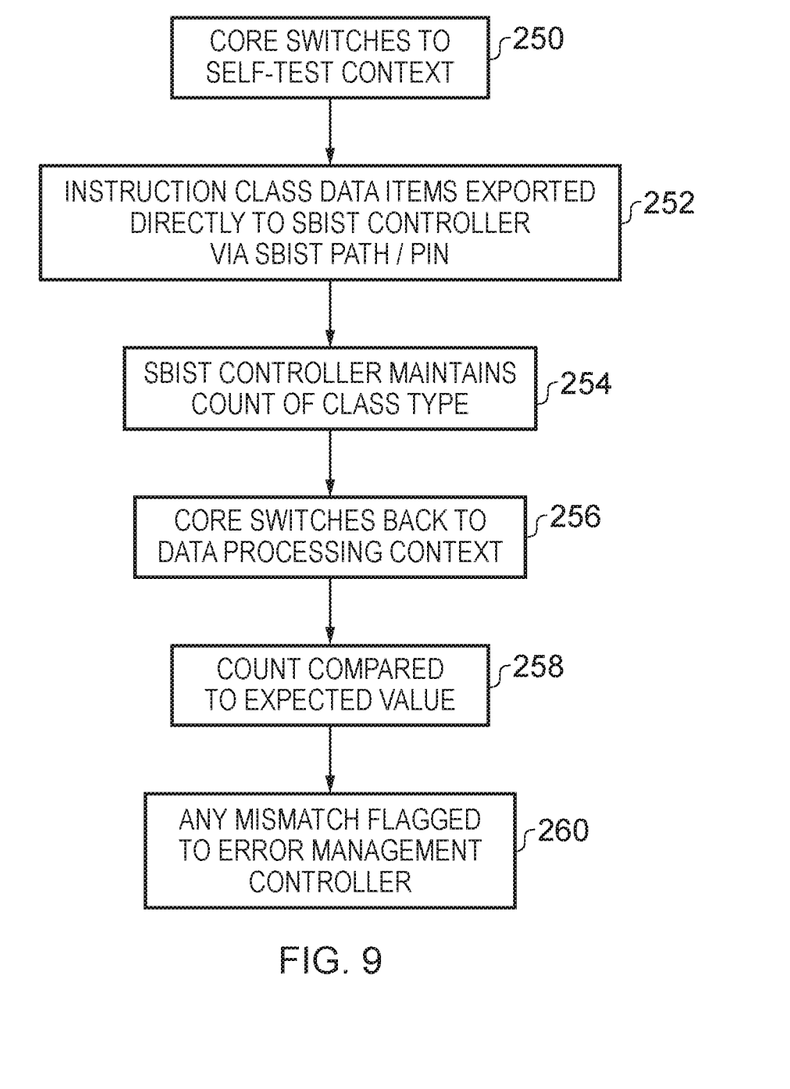
FIG. 9 shows a sequence of steps which are taken according to the method of one embodiment.

FIG. 9 shows a sequence of steps which are carried out according to the method of one example embodiment in which the SBIST controller is configured to monitor instruction class types of the instructions being executed by the processor core. The core context switches to self-test at step 250 and at step 252 corresponding data items are then exported directly to the SBIST controller via the dedicated "SBIST" path/pin. At step 254 of the SBIST controller maintains the count of the class type. Then, at step 256, following a predetermined event or timer expiration, the processor core switches back to its data processing context and at step 258 the count which the SBIST controller has maintained is compared to the expected value. Finally at step 260 any mismatch is flagged as a fault to the error management controller. It should be understood that the self-test context may be ended (at step 256) by any of the above discussed mechanisms (i.e. timer or event based, as well as the natural conclusion of the self-test software).

Figure 10:
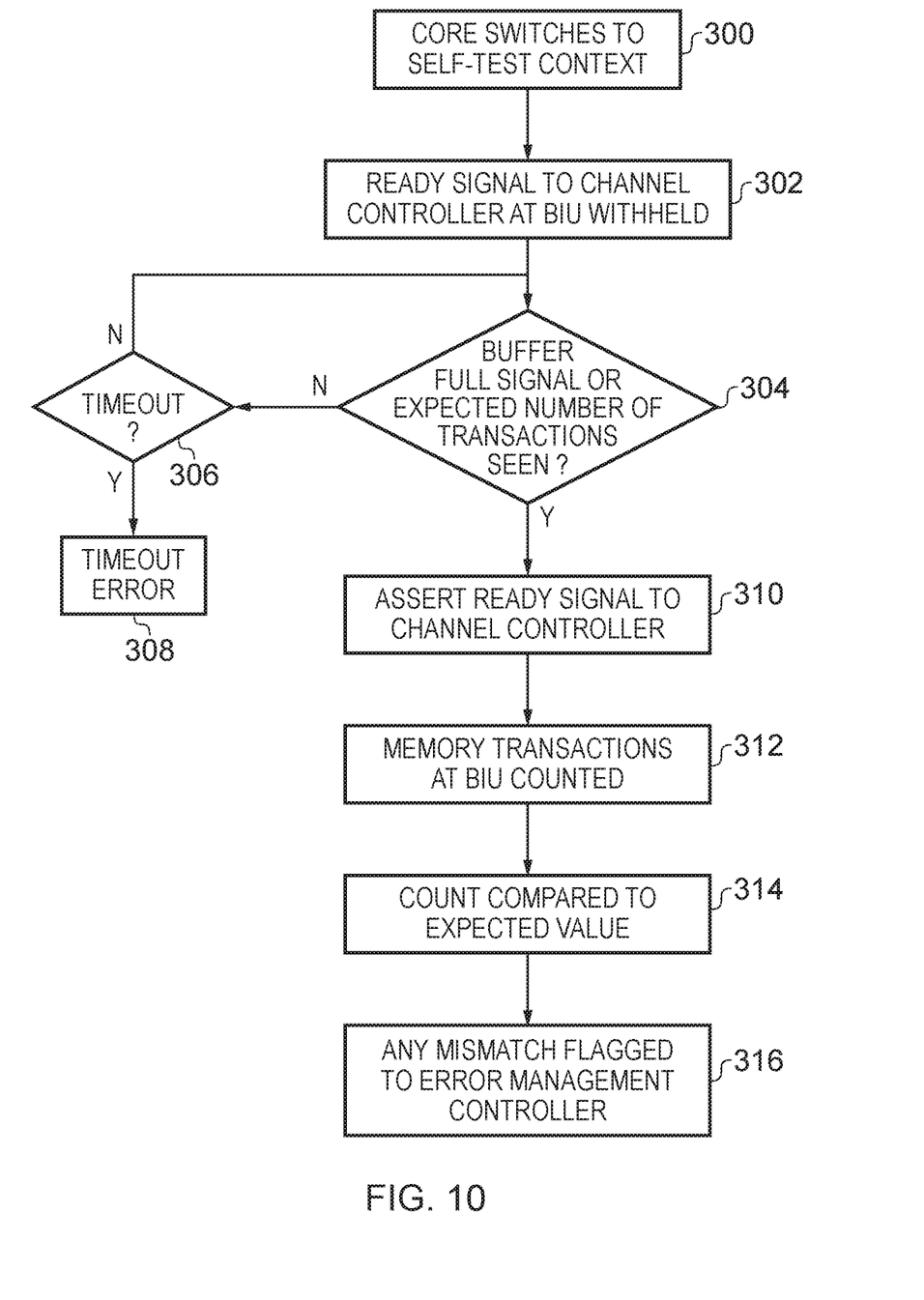
FIG. 10 shows a sequence of steps which are taken according to the method of one embodiment.

FIG. 10 shows a sequence of steps which are carried out according to a method of one example embodiment in which the SBIST controller is configured to monitor memory transaction requests. At step 300 the core switches to its self-test context. At step 302 the SBIST de-asserts the ready signal to the channel controller of the memory interface and thereafter at step 304 it is determined if a buffer full signal (or the expected number of transactions indicating a full buffer) has been seen. Whilst it hasn't the flow proceeds via step 306 where it is checked if a timeout of the timer which the SBIST controller has started when de-asserting the reading signal has occurred and if it has not the flow returns to step 304. If a timeout does occur then at step 308 this is directly signalled to the error management controller as an observed error relating to the self-test procedure. When it is determined at step 304 that the buffer is full then at step 310 the ready signal is asserted. As the memory transactions then pass from the buffer(s) out to the memory system the number of memory transactions are counted by the SBIST controller on the basis of the corresponding indications it receives via the dedicated path connecting the memory interface to the SBIST controller. Once this set of indications has been received then this count is compared to the expected value at step 314 and at step 316 any mismatch is flagged to the error management controller indicating a fault within the memory interface.

In brief overall summary an apparatus and method for processor core self-testing are disclosed. The apparatus comprises processor core circuitry to perform data processing operations by executing data processing instructions. Separate self-test control circuitry causes the processor core circuitry to temporarily switch from a first state of executing the data processing instructions to a second state of executing a self-test sequence of instructions, before returning to the first state of executing the data processing instructions without a reboot of the processor core circuitry being required. There is also self-test support circuitry, wherein the processor core circuitry is responsive to the self-test sequence of instructions to cause an export of at least one self-test data item via the self-test support circuitry to the self-test control circuitry.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. Apparatus comprising:
   processor core circuitry to perform data processing operations by executing data processing instructions;
   self-test control circuitry to cause the processor core circuitry to temporarily switch from a first state of executing the data processing instructions to a second state of executing a self-test sequence of instructions, before returning to the first state of executing the data processing instructions without a reboot of the processor core circuitry being required; and
   self-test support circuitry, wherein the processor core circuitry is responsive to the self-test sequence of instructions to cause an export of at least one self-test data item via the self-test support circuitry to the self-test control circuitry, wherein:
   the processor core circuitry comprises memory transaction buffering circuitry to temporarily hold memory transaction requests before the memory transaction requests are issued to a memory system,
   the self-test support circuitry comprises memory transaction request indication circuitry and the at least one self-test data item comprises at least one memory transaction request indication provided by the memory transaction request indication circuitry,
   the self-test control circuitry is responsive to reception of the at least one memory transaction request indication to maintain a memory transaction request count,
   the self-test control circuitry is capable of comparing the memory transaction request count to an expected memory transaction request count, and
   the self-test support circuitry comprises memory transaction request indication circuitry before the memory transaction buffering circuitry and after the memory transaction buffering circuitry, and the at least one self-test data item comprises memory transaction request indications from before and after the memory transaction buffering circuitry.

2. The apparatus as claimed in claim 1, wherein the processor core circuitry is capable of completing the export of the at least one self-test data item after returning to the first state of executing the data processing instructions.

3. The apparatus as claimed in claim 1, wherein the self-test support circuitry comprises a dedicated self-test data path from the processor core circuitry to the self-test control circuitry.

4. The apparatus as claimed in claim 1, wherein the self-test support circuitry comprises instruction type indication circuitry and the at least one self-test data item comprises at least one instruction type indication provided by the instruction type indication circuitry,
   wherein the self-test control circuitry is responsive to reception of the at least one instruction type indication to maintain an instruction type count,
   and wherein the self-test control circuitry is capable of comparing the instruction type count to an expected instruction type count.

5. The apparatus as claimed in claim 4, wherein the processor core circuitry comprises instruction fetch circuitry and the instruction type indication circuitry is comprised within the instruction fetch circuitry.

6. The apparatus as claimed in claim 4, wherein the processor core circuitry comprises instruction retirement circuitry and the instruction type indication circuitry is comprised within the instruction retirement circuitry.

7. The apparatus as claimed in claim 1, wherein the self-test support circuitry comprises memory transaction blocking circuitry to block issuance of the memory transaction requests to the memory system in dependence on a blocking signal from the self-test control circuitry.

8. The apparatus as claimed in claim 7, wherein the self-test control circuitry is capable of asserting the blocking signal until an indication is received from the memory transaction buffering circuitry that the memory transaction buffering circuitry is full.

9. The apparatus as claimed in claim 8, wherein the indication that the memory transaction buffering circuitry is full comprises the at least one memory transaction request indication when the memory transaction request count reaches the expected memory transaction request count.

10. The apparatus as claimed in claim 8, wherein the indication that the memory transaction buffering circuitry is full comprises a full buffer signal generated by the memory transaction buffering circuitry.

11. The apparatus as claimed in claim 7, wherein the self-test control circuitry comprises timer circuitry and the self-test control circuitry is responsive to an elapsed period signal from the timer circuitry to assert a timeout error signal.

12. The apparatus as claimed in claim 1, wherein the self-test control circuitry is capable of causing the processor core circuitry to operate in the second state of executing the self-test sequence of instructions for a predetermined time period before returning to the first state.

13. The apparatus as claimed in claim 1, wherein the processor core circuitry is capable of switching between data processing operations for more than one application defined by corresponding sets of data processing instructions,
   wherein each application has a predefined priority and the processor core circuitry is responsive to an execution request for an application having a higher predefined priority than a predefined priority of a currently executing application to suspend the currently executing application and to execute the application having the higher predefined priority,
   and wherein the self-test sequence of instructions is defined to have a predefined priority lower than the highest priority available in the apparatus.

14. The apparatus as claimed in claim 1, wherein the self-test control circuitry is responsive to at least one received command by performing at least one of:
   configuring itself and the processor core circuitry for operation in the second state;
   causing the processor core circuitry to switch to the second state; and
   causing the processor core circuitry to switch back to the first state and determining a self-test result from the at least one self-test data item received from the processor core circuitry.

15. The apparatus as claimed in claim 1, comprising error management control circuitry, wherein the self-test control circuitry is capable of signalling a self-test result after the processor core circuitry has completed executing the self-test sequence of instructions, and the error management control circuitry is responsive to the self-test result to initiate an error response.

16. The apparatus as claimed in claim 15, wherein the error response comprises disabling at least one component of the apparatus.

17. A method of operating a data processing apparatus, comprising the steps of:
   performing data processing operations in processor core circuitry in a first state by executing data processing instructions;
   signalling from self-test control circuitry to cause the processor core circuitry to temporarily switch from the first state to a second state of executing a self-test sequence of instructions, before returning to the first state of executing the data processing instructions without a reboot of the processor core circuitry being required; and
   causing an export of at least one self-test data item via self-test support circuitry in the processor core circuitry to the self-test control circuitry, the method further comprising:
   the processor core circuitry temporarily holding memory transaction requests before the memory transaction requests are issued to a memory system,
   wherein the at least one self-test data item comprises at least one memory transaction request indication provided by the self-test control circuitry,
   the self-test control circuitry, in response to reception of the at least one memory transaction request indication, maintaining a memory transaction request count,
   comparing, by the self-test control circuitry, the memory transaction request count to an expected memory transaction request count,
   wherein the self-test support circuitry comprises memory transaction request indication circuitry before the memory transaction buffering circuitry and after the memory transaction buffering circuitry, and the at least one self-test data item comprises memory transaction request indications from before and after the memory transaction buffering circuitry.

18. Apparatus comprising:
means for performing data processing operations by executing data processing instructions;
means for controlling a self-test process comprising causing the means for performing data processing operations to temporarily switch from a first state of executing the data processing instructions to a second state of executing a self-test sequence of instructions, before returning to the first state of executing the data processing instructions without a reboot of the means for performing data processing operations being required; and
means for supporting the self-test process, wherein the means for performing data processing operations is responsive to the self-test sequence of instructions to cause an export of at least one self-test data item via the means for supporting the self-test process to the means for controlling the self-test process, wherein:
the means for performing data processing operations comprises means for temporarily holding memory transaction requests before the memory transaction requests are issued to a memory system,
the means for supporting the self-test process comprises means for indicating a transaction and the at least one self-test data item comprises at least one memory transaction request indication provided by the means for indicating a transaction,
the means for controlling a self-test process is responsive to reception of the at least one memory transaction request indication to maintain a memory transaction request count,
the means for controlling a self-test process is capable of comparing the memory transaction request count to an expected memory transaction request count, and
the means for supporting the self-test process comprises means for indication a memory transaction request before the means for temporarily holding memory transaction requests and after the means for temporarily holding memory transaction requests, and the at least one self-test data item comprises memory transaction request indications from before and after the memory transaction buffering circuitry.

* * * * *